United States Patent
Grubbström (10) Patent No.: US 9,638,416 B2
(45) Date of Patent: May 2, 2017

(54) METHOD OF CLEANING A CARBON DIOXIDE RICH FLUE GAS AND A BOILER SYSTEM

(75) Inventor: Jörgen P. Grubbström, Vaxjo (SE)

(73) Assignee: General Electric Technology GmbH

( * ) Notice: Subject to any disclaimer, the term of this patent is extended or adjusted under 35 U.S.C. 154(b) by 401 days.

(21) Appl. No.: 13/988,518

(22) PCT Filed: Nov. 10, 2011

(86) PCT No.: PCT/IB2011/002677
§ 371 (c)(1),
(2), (4) Date: Aug. 9, 2013

(87) PCT Pub. No.: WO2012/069899
PCT Pub. Date: May 31, 2012

(65) Prior Publication Data
US 2014/0041562 A1    Feb. 13, 2014

(30) Foreign Application Priority Data

Nov. 24, 2010 (EP) .................................. 10192416

(51) Int. Cl.
*F23J 15/02* (2006.01)
*B01D 53/14* (2006.01)
(Continued)

(52) U.S. Cl.
CPC .......... *F23J 15/02* (2013.01); *B01D 46/0067* (2013.01); *B01D 46/04* (2013.01); *B01D 53/002* (2013.01);
(Continued)

(58) Field of Classification Search
CPC .......... B01D 2257/504; B01D 46/0067; B01D 46/04; B01D 53/1475; B01D 53/62; F23J 15/02; Y02C 10/04; Y02C 10/06
See application file for complete search history.

(56) References Cited

U.S. PATENT DOCUMENTS 2,487,576 A  11/1949  Meyers
2,741,330 A   4/1956  Kaess
(Continued)

FOREIGN PATENT DOCUMENTS

CN    101231130 A    7/2008
EP     0 162 536      1/1996
(Continued)

OTHER PUBLICATIONS

Hamid Farzan and Stanley J. Vecci et al, Pilot-Scale Evaluation of Coal Combustion in an Oxygen-Enriched Recycled Flue Gas, 2005, Clearwater, Florida USA, The 30th International Conference on Coal Utilization and Fuel Systems, BR-1764.
(Continued)

*Primary Examiner* — Duane Smith
*Assistant Examiner* — Cabrena Holecek
(74) *Attorney, Agent, or Firm* — GE Global Patent Operation; Cynthia W. Flanigan (57) ABSTRACT

A boiler system (101) comprises a boiler (2) for combusting a fuel in the presence of a gas containing oxygen gas, and a gas cleaning system (106). The boiler system (101) comprises a compression device being operative for pressurizing at least a portion of the carbon dioxide rich flue gas from which at least a portion of the contaminant content has been removed, and a carbon dioxide supply duct (142; 143; 145) being operative for forwarding at least a portion of the pressurized carbon dioxide rich flue gas to at least one gas cleaning device (108; 110; 111) for being utilized as a utility gas therein.

17 Claims, 8 Drawing Sheets (51) Int. Cl.

| | | |
|---|---|---|
| *B01D 46/00* | (2006.01) | |
| *B01D 46/04* | (2006.01) | |
| *B01D 53/00* | (2006.01) | |
| *B01D 53/75* | (2006.01) | |
| *B01D 53/40* | (2006.01) | |
| *B01D 53/62* | (2006.01) | |
| *B01D 53/73* | (2006.01) | |
| *B01D 53/78* | (2006.01) | |
| *B01D 53/83* | (2006.01) | |

(52) U.S. Cl.
CPC ............ *B01D 53/40* (2013.01); *B01D 53/62* (2013.01); *B01D 53/73* (2013.01); *B01D 53/75* (2013.01); *B01D 53/78* (2013.01); *B01D 53/83* (2013.01); *B01D 2257/302* (2013.01); *B01D 2257/504* (2013.01); *B01D 2257/80* (2013.01); *B01D 2258/0283* (2013.01); *Y02C 10/04* (2013.01); *Y02E 20/326* (2013.01)

(56) References Cited

U.S. PATENT DOCUMENTS

| | | | |
|---|---|---|---|
| 3,898,062 A * | 8/1975 | Slakey | 55/282.5 |
| 4,336,035 A | 6/1982 | Evenstad et al. | |
| 4,502,872 A | 3/1985 | Ivester et al. | |
| 4,819,878 A | 4/1989 | Bailey | |
| 5,639,430 A | 6/1997 | Myers | |
| 6,278,899 B1 | 8/2001 | Piche et al. | |
| 2006/0085363 A1 | 4/2006 | Cheng et al. | |
| 2007/0243119 A1 | 10/2007 | Downs et al. | |
| 2008/0178733 A1 | 7/2008 | Gal | |
| 2009/0288556 A1 * | 11/2009 | Gearhart et al. | 95/51 |
| 2010/0077943 A1 | 4/2010 | Fogash et al. | |
| 2011/0167821 A1 | 7/2011 | Baker et al. | |

FOREIGN PATENT DOCUMENTS

| | | |
|---|---|---|
| EP | 1688173 A2 | 8/2006 |
| EP | 1953486 A1 | 8/2008 |
| EP | 2251596 | 11/2010 |
| EP | 2286894 A1 | 2/2011 |
| EP | 2623864 A1 | 8/2013 |
| GB | 2 187 656 | 9/1987 |
| JP | 2009270753 A | 11/2009 |
| RU | 2008144181 | 5/2010 |
| TW | 297446 U | 9/2006 |
| TW | M297466 U | 9/2006 |
| WO | 96/16722 | 6/1996 |
| WO | 96/16727 | 6/1996 |
| WO | 2005/007274 | 1/2005 |

OTHER PUBLICATIONS

European Search Report, European Searching Authority, EP Application No. EP10192416, Munich, Apr. 21, 2011.

International Search Report and Written Opinion, European Searching Authority, PCT Application No. PCT/IB2011/002677, Feb. 27, 2010.

Office action issued from European Patent Office dated Jul. 7, 2015 for EP Application No. 10192416.5.

English Translation of Taiwan Office Action issued in connection with corresponding TW Application No. 100142968 on Dec. 27, 2013.

* cited by examiner

METHOD OF CLEANING A CARBON DIOXIDE RICH FLUE GAS AND A BOILER SYSTEM

FIELD OF THE INVENTION

The present invention relates to a method of cleaning a carbon dioxide rich flue gas generated in a boiler combusting a fuel in the presence of a gas containing oxygen gas.

The present invention further relates to a boiler system comprising a boiler for combusting a fuel in the presence of a gas containing oxygen gas, and a gas cleaning device for cleaning a carbon dioxide rich flue gas generated in the boiler.

BACKGROUND OF THE INVENTION

In the combustion of a fuel, such as coal, oil, peat, waste, etc., in a combustion plant, such as a power plant, a hot process gas is generated, such process gas containing, among other components, carbon dioxide $CO_2$. With increasing environmental demands various processes for removing carbon dioxide from the process gas have been developed. One such process is the so called oxy-fuel process. In an oxy-fuel process a fuel, such as one of the fuels mentioned above, is combusted in the presence of a nitrogen-lean gas. Oxygen gas, which is provided by an oxygen source, is supplied to a boiler in which the oxygen gas oxidizes the fuel. In the oxy-fuel combustion process a carbon dioxide rich flue gas is produced, which can be disposed of in order to reduce the emission of carbon dioxide into the atmosphere.

An example of an oxy-fuel boiler is described in US 2007/0243119. The oxy-fuel boiler of US 2007/0243119 generates a process gas which is referred to as a flue gas. A gas cleaning system comprising various gas cleaning devices are utilized for cleaning the flue gas from, among other things, particulate material and sulfur dioxide, to obtain a gas which is suitable for being disposed of. A problem with the gas cleaning system and method of cleaning a gas disclosed in US 2007/0243119 is the rather high operating costs.

SUMMARY OF THE INVENTION

An object of the present invention is to provide a method of cleaning a carbon dioxide rich flue gas generated in a boiler combusting a fuel in the presence of a gas containing oxygen gas, the method alleviating the problems of the prior art method.

This object is achieved by a method of cleaning a carbon dioxide rich flue gas generated in a boiler combusting a fuel in the presence of a gas containing oxygen gas, the method comprising A) forwarding the carbon dioxide rich flue gas from the boiler to a gas cleaning system, B) removing in said gas cleaning system at least a portion of the contaminant content of the carbon dioxide rich flue gas, C) pressurizing at least a portion of the carbon dioxide rich flue gas from which at least a portion of the contaminant content has been removed, and D) forwarding at least a portion of the pressurized portion of the carbon dioxide rich flue gas from which at least a portion of the contaminant content has been removed to at least one gas cleaning device for being utilized as a utility gas therein.

An advantage of this method is that a process internal gas, originating from the carbon dioxide rich flue gas generated in the boiler, is utilized as a utility gas for a gas cleaning device being in need of a gas for its operation. Hence, the gas supplied as a utility gas to the gas cleaning device will not dilute the carbon dioxide rich flue gas treated therein. This provides for a reduced volume of carbon dioxide rich flue gas to be treated and finally disposed of.

According to one embodiment said step C) is conducted in a gas compression and purification unit operating to prepare from the carbon dioxide rich flue gas that has been cleaned in the gas cleaning system a pressurized carbon dioxide gas for disposal. An advantage of this embodiment is that a compression device already available in the gas compression and purification unit for compressing a major part of the carbon dioxide rich flue gas is also utilized for compressing that portion of the gas which is to be forwarded to the gas cleaning device for use as a utility gas therein. This reduces the investment and maintenance costs. Furthermore, the process occurring in the gas compression and purification unit often involves a reduction of the concentration of contaminants, such as water vapour and sulphur dioxide, of the carbon dioxide rich flue gas, making it more suitable for use as a utility gas in the gas cleaning device.

According to one embodiment the gas compression and purification unit comprises a low pressure compression unit being operative for increasing the pressure of the carbon dioxide rich flue gas to a pressure of 20 to 50 bar absolute pressure, more preferred 20 to 40 bar absolute pressure, wherein said step D) comprises forwarding to said at least one gas cleaning device a gas that has passed through at least a part of the low pressure compression unit.

According to one embodiment said step D) comprises forwarding to said at least one gas cleaning device a gas that has passed through an intermediate dehydration unit located downstream of the low pressure compression unit. An advantage of this embodiment is that a carbon dioxide rich flue gas which both has a suitable pressure and which is quite pure, is forwarded to the gas cleaning device for being utilized as a utility gas. This reduces the risk of corrosion and clogging problems of the gas cleaning device occurring as an effect of the gas supplied thereto as a utility gas.

According to one embodiment the pressurized portion of the carbon dioxide rich flue gas from which at least a portion of the contaminant content has been removed is utilized for pulse-cleaning a gas cleaning device in the form of a fabric filter. Pulse-cleaning of a fabric filter involves a regular supply of a pressurized gas which is subsequently to the pulse-cleaning mixed with the gas being treated in the fabric filter. By utilizing the at least partly cleaned and pressurized carbon dioxide rich flue gas for pulsing, a frequency of pulse-cleaning the fabric filter can be optimized with respect to, for example, dust particle removal efficiency, pressure drop over the fabric filter, life of filter bags, etc., without such optimization being negatively influenced by any need to avoid dilution of the carbon dioxide rich flue gas treated in the fabric filter.

According to one embodiment the pressurized portion of the carbon dioxide rich flue gas from which at least a portion of the contaminant content has been removed is utilized for flushing a cover for an isolator of a gas cleaning device in the form of an electrostatic precipitator. An advantage of utilizing the at least partly cleaned and pressurized carbon dioxide rich flue gas for flushing the electrostatic precipitator isolators is that a relatively large flow of gas can be utilized for such flushing, ensuring that isolators are kept clean from any deposits that may hamper their function, without such large flushing flow causing an unwanted dilution of the carbon dioxide rich flue gas that is to be treated in the electrostatic precipitator and in downstream gas cleaning equipment.

According to one embodiment the pressurized portion of the carbon dioxide rich flue gas from which at least a portion of the contaminant content has been removed is utilized for atomizing an absorption liquid of a gas cleaning device in the form of a spray dryer absorber. An advantage of utilizing the at least partly cleaned and pressurized carbon dioxide rich flue gas for atomization of the absorption liquid is that the flow and pressure of the gas supplied for atomizing the absorption liquid can be optimized with respect to, for example, droplet size of atomized absorption liquid, without the need to consider any dilution of the carbon dioxide rich flue gas that is to be treated in the spray dryer and in downstream gas cleaning equipment.

According to one embodiment the pressurized portion of the carbon dioxide rich flue gas from which at least a portion of the contaminant content has been removed is utilized for fluidization of a particulate material of a gas cleaning device in the form of a mixing device supplying particulate material mixed with absorbent to a contact reactor bringing the particulate material mixed with absorbent into contact with a flue gas. The fluidization of the particulate material tends to require rather large flows of pressurized gas, that need not be very pure. By utilizing the pressurized and at least partly cleaned carbon dioxide rich flue gas for this purpose the fluidization can be made efficient, resulting in an efficient mixing of particulate material and absorbent, without causing a substantial dilution of the carbon dioxide rich flue gas that is to be treated in the contact reactor and in downstream gas cleaning equipment.

According to one embodiment at least a portion of the pressurized portion of the carbon dioxide rich flue gas, from which at least a portion of the contaminant content has been removed, that is forwarded to the mixing device is collected downstream of a filter removing particulate material supplied to said contact reactor by said mixing device, the gas being collected, pressurized and forwarded to said mixing device prior to passing through any gas compression and purification unit. An advantage of this embodiment is that energy consumption in a downstream gas compression and purification unit can be reduced, since that portion which is to be utilized in the mixing device is forwarded to the mixing device without being treated in the gas compression and purification unit.

A further object of the present invention is to provide a boiler system being operative for combusting a fuel in the presence of a gas containing oxygen gas, the boiler system being more efficient than those of the prior art.

This object is achieved by means of a boiler system comprising a boiler for combusting a fuel in the presence of a gas containing oxygen gas, and a gas cleaning system being operative for removing at least a portion of the contaminant content of the carbon dioxide rich flue gas generated in the boiler, the boiler system further comprising:

a compression device being operative for pressurizing at least a portion of the carbon dioxide rich flue gas from which at least a portion of the contaminant content has been removed, and a carbon dioxide supply duct being operative for forwarding at least a portion of the pressurized portion of the carbon dioxide rich flue gas, from which at least a portion of the contaminant content has been removed, to at least one gas cleaning device for being utilized as a utility gas therein.

An advantage of this boiler system is that the volume of carbon dioxide rich flue gas to be disposed of can be reduced, since the use of pressurized and at least partly cleaned carbon dioxide rich flue gas as a utility gas for the gas cleaning device reduces the dilution of the carbon dioxide rich flue gas.

According to one embodiment the at least one gas cleaning device forms part of the gas cleaning system. An advantage of this embodiment is that the pressurized and at least partly cleaned carbon dioxide rich flue gas can be reused as a utility gas in a gas cleaning device forming part of that same gas cleaning system in which the gas has been treated prior to being pressurized. This normally reduces the necessary length of ducts for transporting the utility gas.

Further objects and features of the present invention will be apparent from the description and the claims.

BRIEF DESCRIPTION OF THE DRAWINGS

The invention will now be described in more detail with reference to the appended drawings in which:

FIG. 1b is an enlarged schematic side view, and illustrates a fabric filter illustrated in FIG. 1a.

FIG. 2b is an enlarged schematic side view, and illustrates an atomization arrangement of a spray dryer absorber illustrated in FIG. 2a FIG. 3a is a schematic side view, and illustrates, schematically, an electrostatic precipitator illustrated in FIG. 2a.

FIG. 3b is an enlarged schematic perspective view, and illustrates an isolator of the electrostatic precipitator of FIG. 3a.

DESCRIPTION OF PREFERRED EMBODIMENTS

Figure 1A:
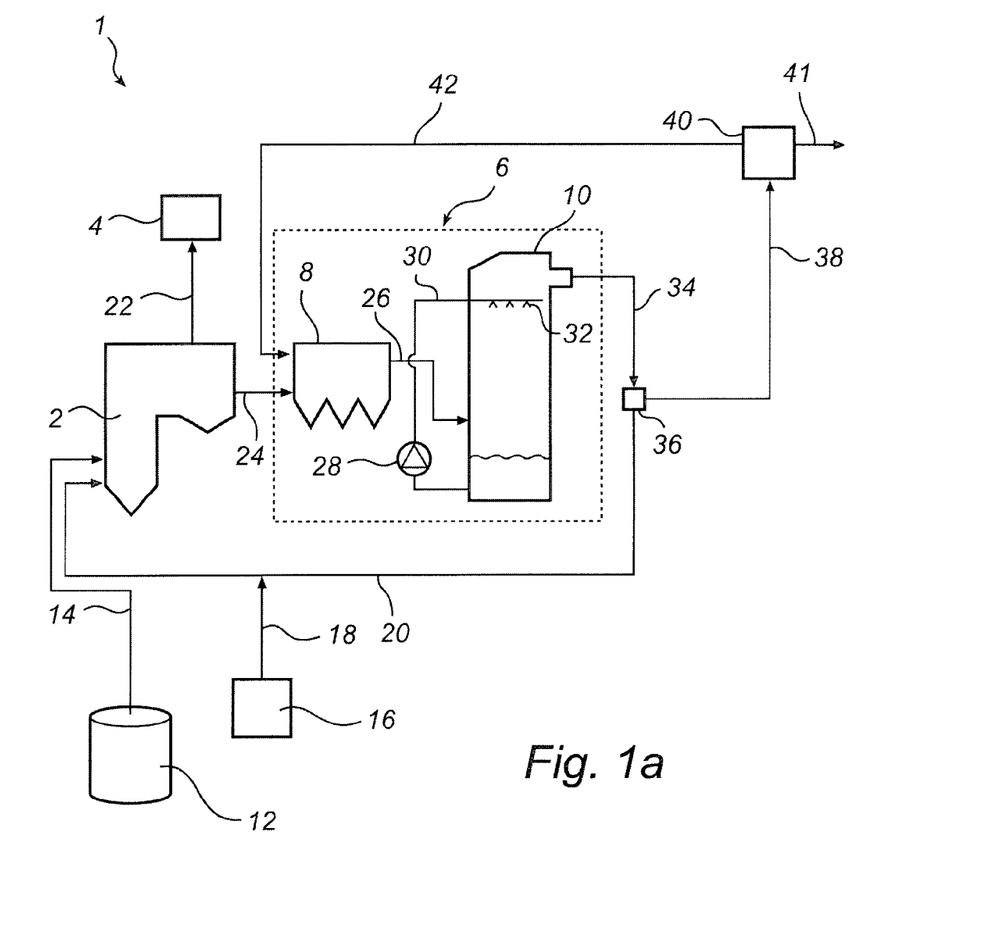
FIG. 1a is a schematic side view of a boiler system in accordance with a first embodiment.

FIG. 1a is a schematic representation of a boiler system 1, as seen from the side thereof. The boiler system 1 comprises, as main components, a boiler 2, being in this embodiment an oxy-fuel boiler, a steam turbine electric power generation system, schematically indicated as 4, and a gas cleaning system 6. The gas cleaning system 6 comprises a particulate removal device, which may be a fabric filter 8, and a sulphur dioxide removal system, which may be a wet scrubber 10.

A fuel, such as coal, oil, or peat, is contained in a fuel storage 12, and can be supplied to the boiler 2 via a supply pipe 14. An oxygen gas source 16 is operative for providing oxygen gas in a manner which is known per se. The oxygen gas source 16 may be an air separation plant operative for separating oxygen gas from air, an oxygen separating membrane, a storage tank, or any other source for providing oxygen gas to the boiler system 1. A supply duct 18 is operative for forwarding the produced oxygen gas, comprising typically 90-99.9 vol. % oxygen, $O_2$, to the boiler 2. A duct 20 is operative for forwarding recirculated flue gas, which contains carbon dioxide, to the boiler 2. As indicated in FIG. 1, the supply duct 18 joins the duct 20 upstream of the boiler 2, such that oxygen gas and recirculated flue gas, which contains carbon dioxide, may become mixed with each other to form a gas mixture containing typically about 20-50% by volume of oxygen gas, the balance being mainly carbon dioxide and water vapour, upstream of the boiler 2. Since almost no air enters the boiler 2 there is almost no nitrogen gas supplied to the boiler 2. In practical operation, less than 3% by volume of the gas volume supplied to the boiler 2 is air, which mainly enters the boiler system 1 as a leakage of air via, for example, the boiler 2 and the gas cleaning system 6. The boiler 2 is operative for combusting the fuel, that is to be supplied via the supply pipe 14, in the presence of the oxygen gas, mixed with the recirculated flue gas, which contains carbon dioxide, that is to be supplied via the duct 20. A steam pipe 22 is operative for forwarding steam, that will be produced in the boiler 2 as a result of the combustion, to the steam turbine electric power generation system 4, which is operative for generating power in the form of electric power.

A duct 24 is operative for forwarding carbon dioxide rich flue gas generated in the boiler 2 to the fabric filter 8. By "carbon dioxide rich flue gas" is meant that the flue gas leaving the boiler 2 via the duct 24 will contain at least 40% by volume of carbon dioxide, $CO_2$. Often more than 50% by volume of the flue gas leaving the boiler 2 will be carbon dioxide. Typically, the flue gas leaving boiler 2 will contain 50-80% by volume of carbon dioxide. The balance of the "carbon dioxide rich flue gas" will be about 15-40% by volume of water vapour ($H_2O$), 2-7% by volume of oxygen ($O_2$), since a slight oxygen excess is often preferred in the boiler 2, and totally about 0-10% by volume of other gases, including mainly nitrogen ($N_2$) and argon (Ar), since some leakage of air can seldom be completely avoided.

The carbon dioxide rich flue gas generated in the boiler 2 may typically comprise contaminants in the form of, for example, dust particles, hydrochloric acid, HCl, sulphur oxides, $SO_x$, and sometimes heavy metals, such as mercury, Hg, that should be removed, at least partly, from the carbon dioxide rich flue gas prior to disposing of the carbon dioxide.

The fabric filter 8, which may be of a type which is per se known from, for example, U.S. Pat. No. 4,336,035 removes most of the dust particles from the carbon dioxide rich flue gas. A duct 26 is operative for forwarding the carbon dioxide rich flue gas from the fabric filter 8 to the wet scrubber 10 of the gas cleaning system 6.

The wet scrubber 10 is of the tower scrubber type, a scrubber type which is per se known from, for example, EP 0 162 536. The wet scrubber 10, which is operative for removing at least a portion, and preferably at least 80%, of the sulphur dioxide content of the carbon dioxide rich flue gas coming from the boiler 2 via the fabric filter 8, comprises a circulation pump 28 which is operative for circulating, in a slurry circulation pipe 30, a slurry comprising lime stone, $CaCO_3$, from the bottom of the wet scrubber 10 to a set of slurry nozzles 32 arranged in the upper portion of the wet scrubber 10. The slurry nozzles 32 are operative for finely distributing the lime stone slurry in the wet scrubber 10 and to achieve good contact between the lime stone slurry and the flue gas being forwarded to the wet scrubber 10 via the duct 26 and flowing substantially vertically upwards inside the wet scrubber 10. In the wet scrubber 10, sulphur dioxide, $SO_2$, of the carbon dioxide rich flue gas reacts with the lime stone, $CaCO_3$, to form gypsum, $CaSO_4$, which, after being dewatered, may be commercially used, for example in wall board production.

As alternative to the wet scrubber 10 other devices may be utilized for removing sulphur dioxide from the carbon dioxide rich flue gas. One such alternative device is a bubbling bed scrubber, an example of which is disclosed in WO 2005/007274.

Returning to FIG. 1a, an at least partly cleaned carbon dioxide rich flue gas leaves the wet scrubber 10 via a duct 34 which forwards the flue gas to a gas splitting point 36, where the at least partly cleaned carbon dioxide rich flue gas is divided into two flows, namely a first flow, which via the duct 20 is recirculated back to the boiler 2, and a second flow, which via a duct 38 is forwarded to a gas compression and purification unit (GPU) 40, which is a further, optional, main component of the boiler system 1. In the GPU 40 the cleaned carbon dioxide rich flue gas is compressed for disposal. Compressed carbon dioxide hence leaves the GPU 40 via a duct 41 and is transported away for disposal, which is sometimes referred to as "$CO_2$ sequestration". The first flow, which is recirculated back to the boiler 2 via duct 20, typically comprises 50-75% by volume of the total flow of the partly cleaned carbon dioxide rich flue gas leaving the wet scrubber 10. The second flow, typically comprising 25-50% by volume of the total flow of the partly cleaned carbon dioxide rich flue gas leaving the wet scrubber 10, is, hence, forwarded, via the duct 38, to the GPU 40, which will be described in more detail hereinafter. A carbon dioxide supply duct 42 is operative for forwarding a pressurized and at least partly cleaned carbon dioxide gas from the GPU 40 to the fabric filter 8 for being used as a pulsing gas, as will be described hereinafter with reference to FIG. 1b.

Figure 1B:
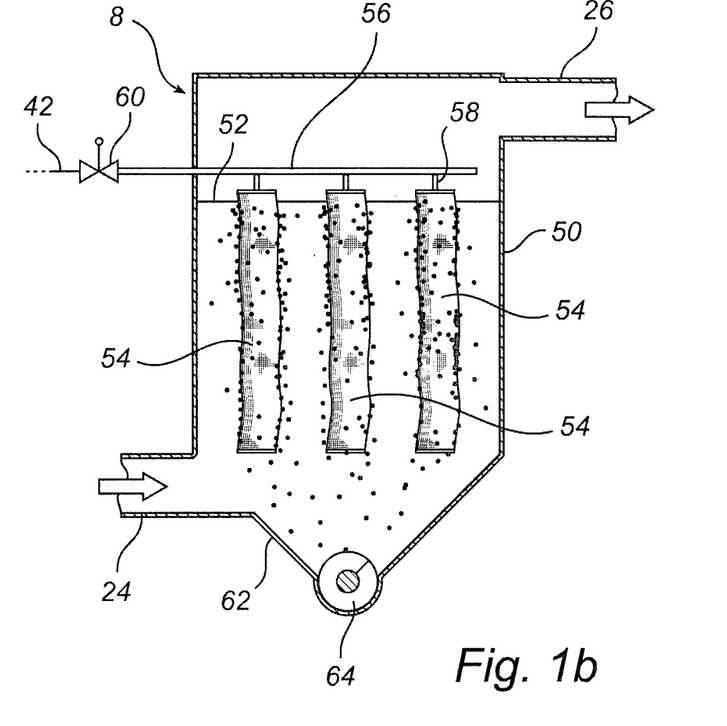

FIG. 1b illustrates, schematically, the fabric filter 8 in more detail. The fabric filter 8 comprises a housing 50. The duct 24 forwarding carbon dioxide rich flue gas from boiler 2 illustrated in FIG. 1a is connected to a lower portion of the housing 50, and the duct 26 is connected to an upper portion of the housing 50. A horizontal plate 52 is arranged in the housing 50 between the connections to the ducts 24, 26. In the plate 52 a number of fabric filtering devices in the form of fabric bags 54 have been arranged, each such fabric bag 54 extending through a corresponding opening in the plate 52. Typically, a fabric filter 8 may comprise 2 to 20 000 such fabric bags 54. In operation, dust particle loaded gas enters the lower portion of the housing 50 via the duct 24. The gas passes through the fabric of the bags 54 and into the interior of the bags 54, while the dust particles are collected on the outside of the bags 54. Then, cleaned gas is forwarded, via the interior of the bags 54, through the plate 52, and leaves the fabric filter 8 via the duct 26.

Occasionally, it is necessary to remove collected dust particles from the bags 54. A pulsing gas duct 56 is arranged in the upper portion of the fabric filter 8. The pulsing gas duct 56 is provided with one pulsing nozzle 58 for each of the bags 54. The pulsing gas duct 56 is connected to the carbon dioxide supply duct 42 being operative for forwarding, as a utility gas for the fabric filter 8, a pressurized and at least partly cleaned carbon dioxide gas from the GPU 40 illustrated in FIG. 1a. By "utility gas" is meant a gas which is utilized in the fabric filter 8 for the operation thereof.

A control valve 60 is arranged on the carbon dioxide supply duct 42. When it has been determined that it is suitable to remove collected dust particles from the bags 54, such determination being based on, for example, a certain time having elapsed since the last removal of dust particles, or a certain pressure drop, as measured between the duct 24 and the duct 26, being reached, the valve 60 is opened for a short period of time, typically a period of time of 150 to 500 ms. The opening of the valve 60 results in a short pulse of carbon dioxide gas being directed, via the pulsing gas duct 56 and the respective pulsing nozzles 58, into the bags 54.

As an effect of such pulsing, the bags 54 expand rapidly, causing most, if not all, of the dust collected thereon being released from the bags 54. Such released dust falls down into a hopper 62 of the housing 50. Hence, the duct 56, the nozzles 58 and the valve 60 form a pulse-cleaning system of the fabric filter 8. Occasionally the dust is removed from the hopper 62 by means of, for example, a screw 64. The carbon dioxide supplied via duct 42 typically has an absolute pressure of 2-6 bar, to be suitable for pulse-cleaning of the fabric filter 8. Since the gas utilized for pulsing is forwarded from the GPU 40 it comprises, typically, 75-90% by volume of carbon dioxide, $CO_2$. Hence, the pulsing of the fabric filter 8 by means of such gas does not result in any unwanted dilution of the carbon dioxide rich flue gas being treated in the fabric filter 8. Furthermore, and as will be elaborated hereinafter, the carbon dioxide is pressurized in the GPU 40, and hence it is not necessary to utilize a separate blower or compressor to obtain the desired gas pressure for pulse-cleaning the bags 54.

Figure 2A:
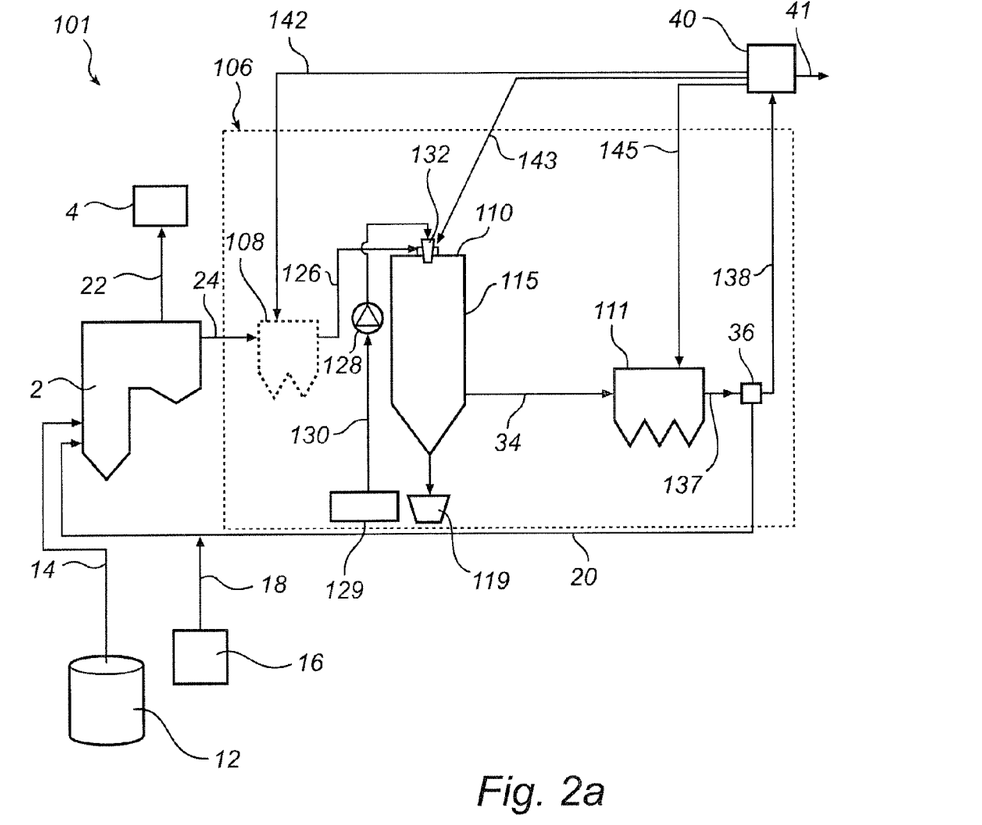
FIG. 2a is a schematic side view of a boiler system in accordance with a second embodiment.

FIG. 2a is a schematic representation of a boiler system 101 in accordance with an alternative embodiment and as seen from the side thereof. Those items of the boiler system 101 that are similar to items of the boiler system 1 have been given the same reference numbers. The boiler system 101 comprises, as main components, a boiler 2, being in this embodiment an oxy-fuel boiler, a steam turbine electric power generation system, schematically indicated as 4, and a gas cleaning system 106. The gas cleaning system 106 comprises a particulate removal device in the form of for example, an electrostatic precipitator 108, a sulphur dioxide removal system in the form of a spray dryer absorber 110, and a fabric filter 111. The electrostatic precipitator 108 is optional, and may be omitted, or substituted for another type of particulate removal device, for example a fabric filter.

Fuel from fuel storage 12 and oxygen gas from gas source 16 are supplied to boiler 2 via pipes 14 and 18, respectively, in a similar manner as described hereinbefore with reference to FIGS. 1a and 1b. Fuel mixed with oxygen gas and recirculated flue gas, supplied via duct 20, is combusted in boiler 2. Steam pipe 22 forwards generated steam to power generation system 4.

A duct 24 is operative for forwarding carbon dioxide rich flue gas generated in the boiler 2 to the electrostatic precipitator 108. The electrostatic precipitator 108 removes most of the dust particles from the carbon dioxide rich flue gas. A duct 126 is operative for forwarding the carbon dioxide rich flue gas from the electrostatic precipitator 108 to the spray dryer absorber 110 of the gas cleaning system 106.

The spray dryer absorber 110, which may be of a type which is per se known from, for example, U.S. Pat. No. 5,639,430, comprises a housing 115. In an upper portion of the housing 115 at least one atomization nozzle 132 is arranged. The atomization nozzle 132 may be of a type which is per se known from, for example, U.S. Pat. No. 4,819,878. A slurry mixing tank 129 is operative for the preparation of a slurry comprising an absorbent, such as hydrated lime, $CaOH_2$, and water. A slurry pump 128 is operative for pumping, in a pipe 130, the slurry from the slurry mixing tank 129 to the atomization nozzle 132. The atomization nozzle 132 is operative for atomizing the slurry and mixing the slurry with carbon dioxide rich flue gas entering the spray dryer absorber via duct 126. As a result of such mixing the absorbent comprised in the slurry will react with sulphur dioxide of the flue gas and form, due to simultaneous drying of the slurry inside the housing 115 of spray dryer absorber 110, a solid rest product. The solid rest product is partly collected in the bottom of housing 115 and is subsequently transported to rest product bin 119.

An at least partly cleaned carbon dioxide rich flue gas leaves spray dryer absorber 110 via a duct 34 which forwards the flue gas to the fabric filter 111. The flue gas entering fabric filter 111 may contain a remaining portion of rest products from spray dryer absorber 110 that were not collected in bottom of housing 115. In fabric filter 111 at least a portion of such remaining portion of reaction products is removed from flue gas in accordance with the principles already described with reference to fabric filter 8. The partly cleaned carbon dioxide rich flue gas leaving the fabric filter 111 is then forwarded, via a duct 137, to a gas splitting point 36. At the gas splitting point 36, the at least partly cleaned carbon dioxide rich flue gas is divided into two flows, namely a first flow, which via the duct 20 is recirculated back to the boiler 2, and a second flow, which is forwarded, via a duct 138, to GPU 40, in which the cleaned carbon dioxide rich flue gas is compressed for disposal via duct 41.

A first carbon dioxide supply duct 142 is operative for forwarding a clean carbon dioxide gas as a utility gas from the GPU 40 to the electrostatic precipitator 108 for being used as an isolator flushing gas, as will be described hereinafter with reference to FIGS. 3a and 3b.

A second carbon dioxide supply duct 143 is operative for forwarding a clean carbon dioxide gas as a utility gas from the GPU 40 to the spray dryer absorber 110 for being used as an atomization gas, as will be described hereinafter with reference to FIG. 2b.

A third carbon dioxide supply duct 145 is operative for forwarding a clean carbon dioxide gas as a utility gas from the GPU 40 to the fabric filter 111 for being used as a pulsing gas, in accordance with similar principles as described hereinbefore with reference to FIG. 1b.

Figure 2B:
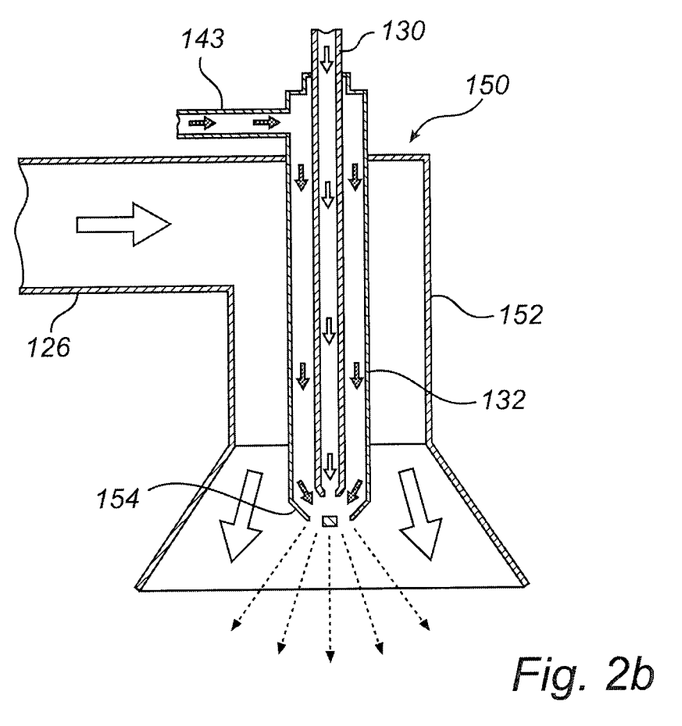

FIG. 2b illustrates a slurry atomization arrangement 150 of the spray dryer absorber 110 illustrated in FIG. 2a. As is illustrated in FIG. 2b, the arrangement 150 comprises a gas distribution casing 152 which is connected to duct 126 feeding flue gas to spray dryer 110. The distributing casing 152 provides a uniform distribution of the flue gas, and makes the flue gas spin around atomization nozzle 132 arranged centrally in gas distributing casing 152. Second carbon dioxide supply duct 143 supplies clean carbon dioxide gas at a gauge pressure, i.e. a pressure above atmospheric pressure, of, typically, 2-6 bar to nozzle 132. Pipe 130 supplies slurry, pumped by slurry pump 128 illustrated in FIG. 2a, to nozzle 132. In nozzle 132 the carbon dioxide gas is forwarded downwards outside of, and separated from, the slurry. At a mouth 154 of nozzle 132 the pressurized carbon dioxide is brought into contact with the slurry. The effect of such contact between pressurized carbon dioxide gas and slurry at mouth 154 of nozzle 132 is that the pressurized carbon dioxide gas causes an atomization of the slurry, resulting in an atomized slurry leaving nozzle 132 and being mixed, adjacent to and below mouth 154, with the flue gas entering via duct 126. Such mixing of atomized slurry and flue gas causes an efficient reaction between absorbent of the slurry and sulphur dioxide of the flue gas. Utilizing clean carbon dioxide gas from GPU 40 for atomizing the slurry in nozzle 132 does not result in any unwanted dilution of the carbon dioxide rich flue gas being treated in the spray dryer absorber 110. Furthermore, and as will be elaborated hereinafter, the carbon dioxide is pressurized in the GPU 40, and hence it is not necessary to utilize a separate blower or compressor to obtain the desired gas pressure for obtaining the desired atomization in the nozzle 132.

Figure 3A:
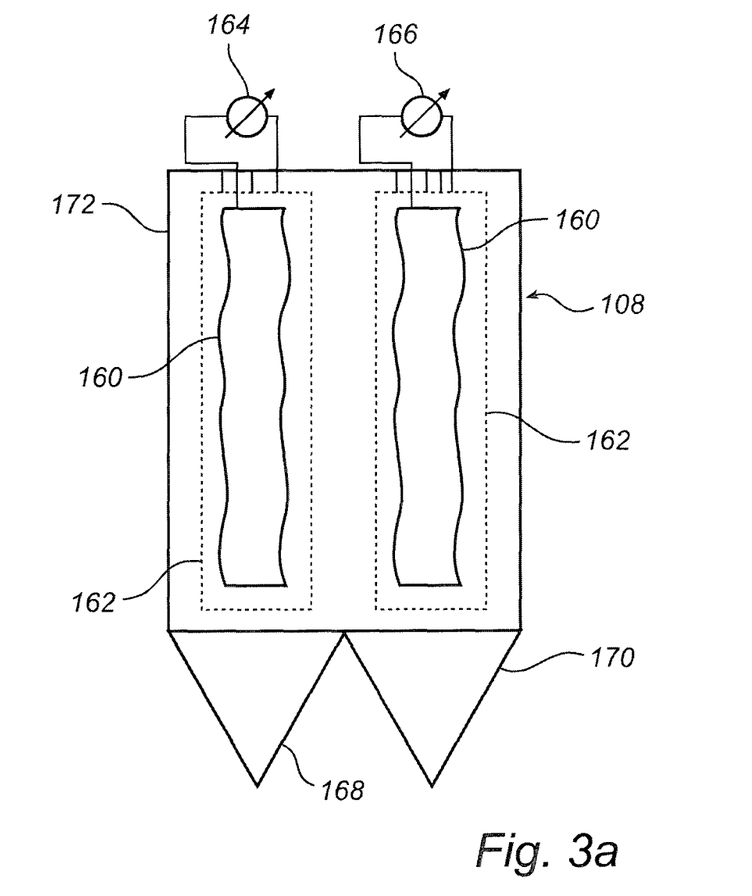

FIG. 3a illustrates the electrostatic precipitator 108 of FIG. 2a in more detail. The electrostatic precipitator 108 comprises several discharge electrodes 160 and several collecting electrode plates 162 arranged in a similar manner as is illustrated in more detail in, for example, U.S. Pat. No. 4,502,872. Rectifiers 164, 166 apply power, i.e., voltage and current, between the discharge electrodes 160 and the collecting electrode plates 162 to charge the dust particles present in the flue gas flowing through electrostatic precipitator 108. After being so charged, the dust particles collect on collecting electrode plates 162. Occasionally, the collecting electrode plates 162 are shaken by means of a rapping device, not illustrated in FIG. 3a for the purpose of maintaining clarity of illustration therein, causing collected dust to be released from the collecting electrode plates 162 and fall down into hoppers 168, 170 from which the collected dust may be transported for disposal.

The collecting electrode plates 162 are normally suspended directly from the roof of the housing 172 of the electrostatic precipitator 108. The discharge electrodes 160 need also to be suspended, but in such a manner that no electrical contact between discharge electrodes 160 and collecting electrode plates 162 can occur. To this end large isolators are utilized for suspension of the discharge electrodes 160.

Figure 3B:
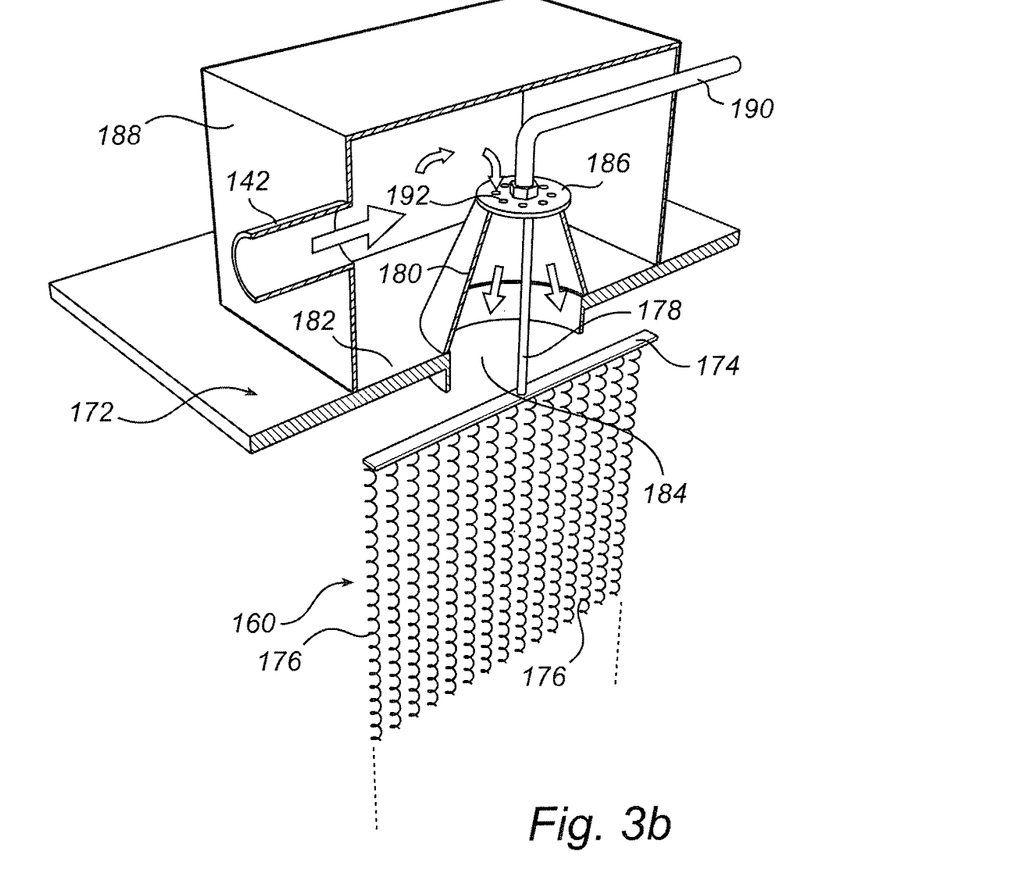

FIG. 3b illustrates the suspension of one discharge electrode 160 of the electrostatic precipitator 108 in more detail. The discharge electrode 160 comprises a frame 174 which supports a number of electrodes 176, that may, for example, have the form of spirals. A holding rod 178 is connected to the frame 174 and extends vertically upwards from the frame 174 to an isolator 180 having the form of a cone which is open in both ends. The isolator 180, which may be made of a non-conductive ceramic material, stands on the roof 182 of the housing 172. An opening 184 is formed in the roof 182 just below the isolator 180. The holding rod 178 extends through the opening 184 and through the isolator 180. At an upper end of the holding rod 178 a support washer 186 is mounted. The support washer 186 rests on the isolator 180 and keeps the rod 178, and hence the discharge electrode 160, suspended in the housing 172.

A cover 188 is arranged around the isolator 180 to protect it from physical damage, dust, etc. An electrical cable 190 extends from the holding rod 178, through the cover 188 and further to the rectifier 164, illustrated in FIG. 3a, to supply power to the discharge electrode 160.

The first carbon dioxide supply duct 142 illustrated in FIG. 2a is, as illustrated in FIG. 3b, connected to the cover 188 to supply a clean carbon dioxide gas as a utility gas to the cover 188. The carbon dioxide gas enters into the cover 188 and is then transported, via at least one opening 192 formed in the support washer 186, into the interior of the isolator 180. The carbon dioxide gas flows downwards along the holding rod 178 and finally becomes mixed with the carbon dioxide rich flue gas being treated in the electrostatic precipitator 108. Thanks to the carbon dioxide gas being supplied to the cover 188 and flowing downwards along the holding rod 178 inside the isolator 180 the risk of dust and/or moisture being deposited inside the isolator 180 is reduced or even eliminated. Hence, the cover 188 and the opening 192 form an isolator flushing system. Typically, the carbon dioxide would be supplied to the cover 188 at a pressure of about 50 to 5000 Pascal above atmospheric pressure, meaning that the pressure of the gas leaving the GPU 40 via duct 142 is normally more than sufficient, as will be further elaborated hereinafter. Utilizing clean carbon dioxide gas from GPU 40 for keeping the isolator 180 of electrostatic precipitator 108 free from deposits does not result in any unwanted dilution of the carbon dioxide rich flue gas being treated in the electrostatic precipitator 108.

Figure 4:
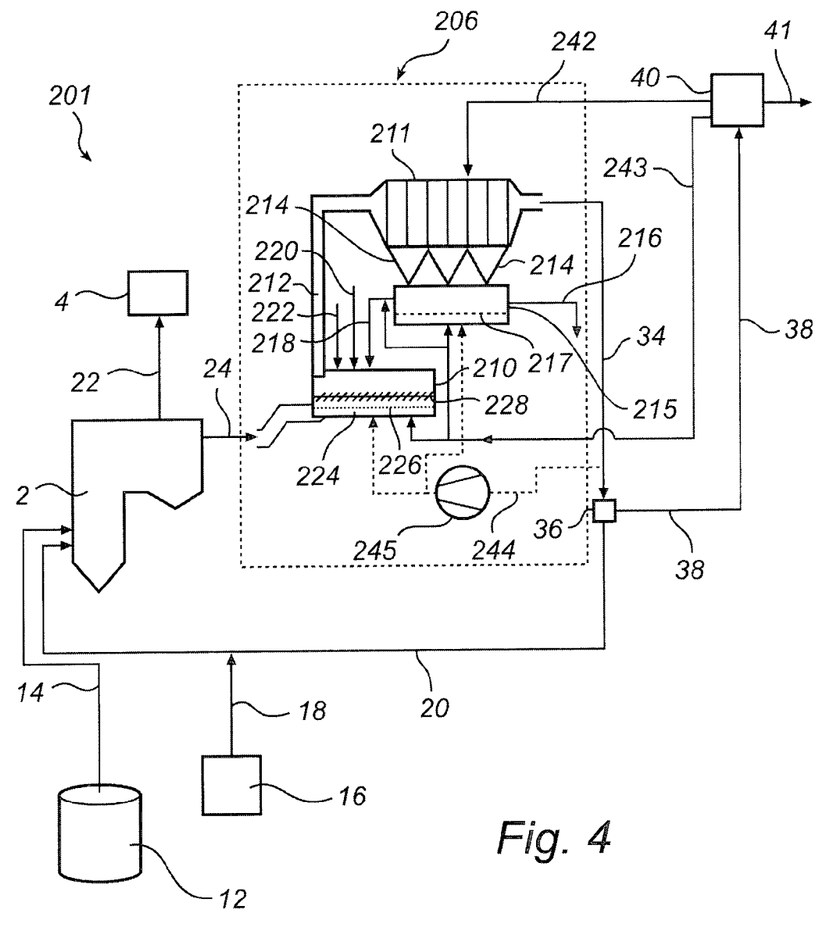
FIG. 4 is a schematic side view of a boiler system in accordance with a third embodiment.

FIG. 4 is a schematic representation of a boiler system 201 in accordance with a further alternative embodiment and as seen from the side thereof. Those items of the boiler system 201 that are similar to items of the boiler system 1 have been given the same reference numbers. The boiler system 201 comprises, as main components, a boiler 2, being in this embodiment an oxy-fuel boiler, a steam turbine electric power generation system, schematically indicated as 4, and a gas cleaning system 206. The gas cleaning system 206 comprises an absorbent-water mixing device 210, a contact reactor 212, and a particulate removal device in the form of fabric filter 211.

Fuel from fuel storage 12 and oxygen gas from gas source 16 are supplied to boiler 2 via pipes 14 and 18, respectively, in a similar manner as described hereinbefore with reference to FIG. 1a. Fuel mixed with oxygen gas and recirculated flue gas, supplied via duct 20, is combusted in boiler 2. Steam pipe 22 forwards generated steam to power generation system 4.

A duct 24 is operative for forwarding carbon dioxide rich flue gas generated in the boiler 2 to the contact reactor 212. In the contact reactor 212 the carbon dioxide rich flue gas is brought into contact with a dust material, preferably a moistened dust material, comprising, for example, recirculated dust and an absorbent, such as hydrated lime, $Ca(OH)_2$. The flue gas and the moistened dust material is then forwarded from the contact reactor 212 to the fabric filter 211, in which the dust material, i.e. the recirculated dust and the absorbent, is separated from the flue gas in accordance with the principles described hereinbefore with reference to fabric filter 8. In the contact reactor 212 and in the fabric filter 211 acid components, such as sulphur dioxide, $SO_2$, sulphur trioxide, $SO_3$, and hydrochloric acid, HCl, react with the absorbent. Reaction products formed in the reaction between the absorbent and the acid components are collected in the fabric filter 211 along with the recirculated dust and dust particles generated in the combustion in the boiler 2.

An at least partly cleaned carbon dioxide rich flue gas leaves fabric filter 211 via a duct 34 which forwards the flue gas to a gas splitting point 36. At the gas splitting point 36, the at least partly cleaned carbon dioxide rich flue gas is divided into two flows, namely a first flow, which via the duct 20 is recirculated back to the boiler 2, and a second flow, which via a duct 38 is forwarded to GPU 40, in which the cleaned carbon dioxide rich flue gas is compressed for disposal via duct 41.

A first carbon dioxide supply duct 242 is operative for forwarding a clean carbon dioxide gas as a utility gas from the GPU 40 to the fabric filter 211 for being used as a pulsing gas, in accordance with similar principles as described hereinbefore with reference to FIG. 1b.

A second carbon dioxide supply duct 243 is operative for forwarding a clean carbon dioxide gas as a utility gas from the GPU 40 to the mixing device 210 for being used as a fluidization gas, as will be described in more detail hereinafter.

The absorbent and dust material collected in the fabric filter 211 is removed from filter bags in accordance with similar principles as illustrated hereinbefore with regard to the fabric filter 8 and is collected in hoppers 214. The material collected in the hoppers 214 is forwarded to a fluidized trough 215. A portion of the material collected in the fluidized trough 215 is transported, via pipe 216, for disposal. However, a large portion of the material collected in fluidized trough 215 is recirculated, via pipe 218, to mixing device 210. The fluidized trough 215 is provided with a fluidization cloth 217. Pressurized carbon dioxide is supplied, via the second carbon dioxide supply duct 243, below the fluidization cloth 217, and causes material supplied on top of fluidization cloth 217 to fluidize. Hence, the material collected in fluidized trough 215 will behave, in such a fluidized state, almost like a liquid and will freely flow towards pipe 216 and pipe 218, respectively. Optionally, the pipe 218 may be an air slide in which material is transported from the trough 215 to the mixer 210 in a fluidized state. To this end, pressurized carbon dioxide is supplied, via the second carbon dioxide supply duct 243, also the pipe 218 to fluidize material transported therein. As a further option, the pipe 216 may also be an air slide, which is supplied with fluidization gas via second carbon dioxide supply duct 243 (not shown in FIG. 4).

The mixing device 210 may be of a type which is per se known from, for example, WO 96/16727 and WO 96/16722. Water is supplied to mixing device 210 via a pipe 220, and fresh absorbent is supplied to mixing device 210 via pipe 222. Duct 243 supplies pressurized carbon dioxide gas to a chamber 224 located at the bottom of the mixing device 210. A fluidization cloth 226 separates chamber 224 from upper portion of mixing device 210. As an effect of pressurized carbon dioxide gas being supplied to chamber 224 the recirculated material supplied to mixing device 210, on top of fluidization cloth 226, is caused to fluidize. The fluidization of the recirculated material causes an intense mixing of recirculated material, water supplied via pipe 220 and fresh absorbent supplied via pipe 222. An agitator 228 arranged in mixing device 210 further enhances the degree of mixing. A well-mixed material is finally forwarded from mixing device 210 to contact reactor 212 in which further reaction between absorbent and acid components of the flue gas may occur. The carbon dioxide gas utilized for the fluidization in the mixing device 210 is, at least partly, forwarded to contact reactor 212 and is mixed with the carbon dioxide rich flue gas treated therein. Utilizing clean carbon dioxide gas from GPU 40 for fluidizing material in mixing device 210 and for cleaning fabric filter 211 by means of pulsing, in accordance with the principles described hereinbefore with reference to the fabric filter 8, does not result in any unwanted dilution of the carbon dioxide rich flue gas being treated in the gas cleaning system 206.

In accordance with an alternative embodiment, a portion of the carbon dioxide rich flue gas leaving fabric filter 211 is removed from duct 34 by means of a carbon dioxide supply duct 244 and a compression device in the form of, for example, a blower 245, or a fan. The blower 245 compresses the carbon dioxide rich flue gas to a suitable pressure, which may typically be a gauge pressure of 0.1 to 0.3 bar, and forwards the thereby compressed carbon dioxide rich flue gas as a utility gas to chamber 224 of mixing device 210. The compressed and at least partly cleaned carbon dioxide rich flue gas supplied from blower 245 will hence pass through fluidization cloth 226 and fluidize material in upper part of mixing device 210. The carbon dioxide rich flue gas hence forwarded from duct 34 will have a lower purity than gas from GPU 40, but such lower purity may sometimes be acceptable to mixing device 210 with regard to, for example, corrosion, clogging of cloth 226, etc. Optionally, the blower 245 may also supply compressed carbon dioxide rich flue gas as a utility gas to trough 215 and pipe 218, when the latter is an air slide, to accomplished fluidization of material in the trough 215 and in the pipe 218. The blower 245 may also supply compressed carbon dioxide rich flue gas as a utility gas to pipe 216, when the latter is an air slide, to facilitate transport to a rest product silo or a similar intermediate storing device.

Figure 5:
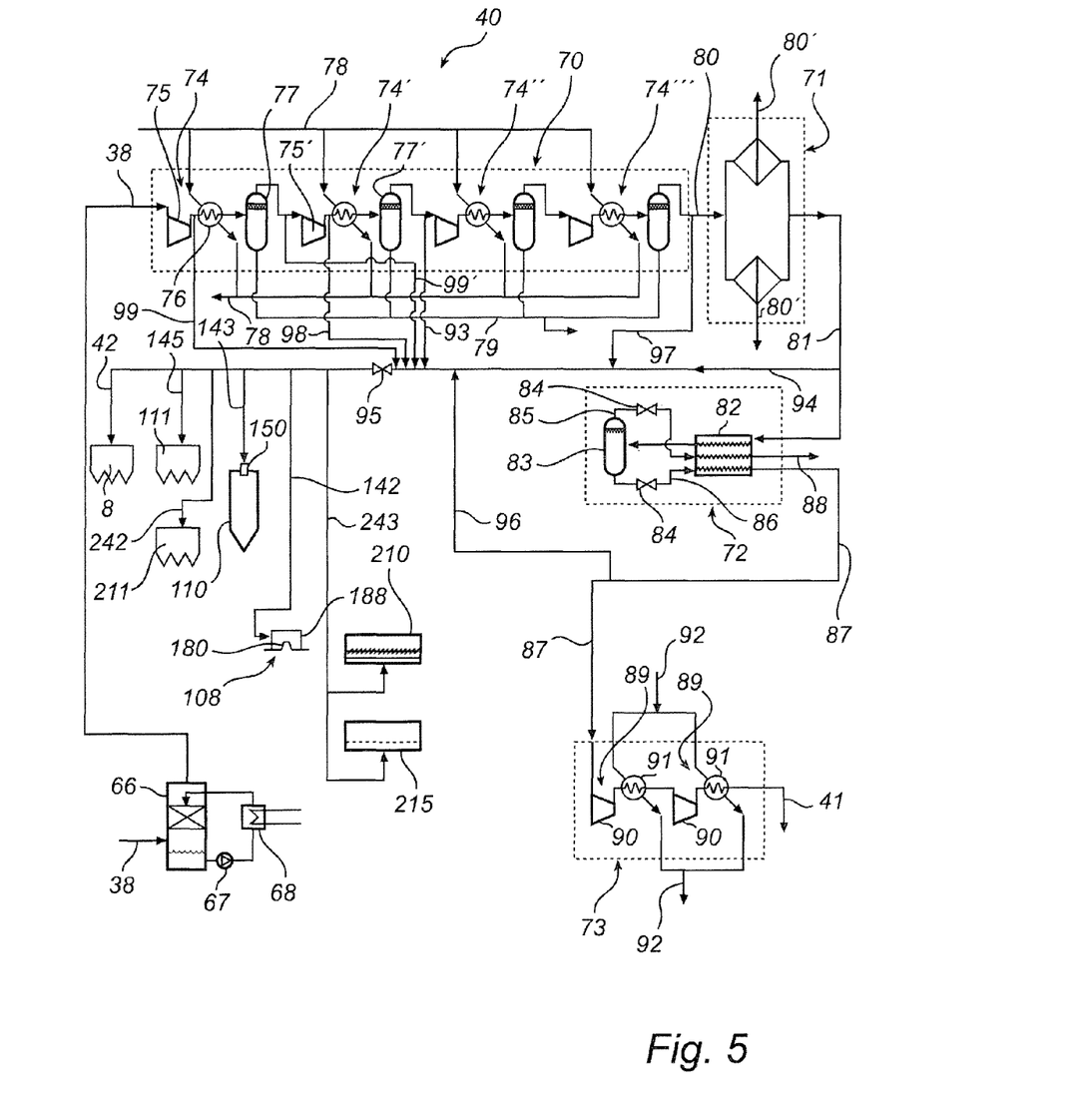
FIG. 5 is a schematic side view of a gas compression and purification unit.

FIG. 5 illustrates the GPU 40 in more detail. The GPU 40 may be comprised in the boiler system 1, 101 or 201 described hereinbefore with reference to FIGS. 1a, 2a, and 4. The definition of a GPU 40 is that it is a unit that compresses the carbon dioxide rich flue gas coming from the gas cleaning system 6, 106, 206 to an absolute pressure of at least 70 bar, typically an absolute pressure of 70-200 bar, making the carbon dioxide suitable for disposal, or suitable for being transported away for disposal. Such disposal could, for example, include pumping the carbon dioxide into a saline aquifer, pumping the carbon dioxide deep into the sea, or reusing the carbon dioxide in an industrial process. Often, but not necessarily, the GPU 40 would comprise devices for increasing the degree of purity of the carbon dioxide.

Optionally, a condenser 66 may be arranged along the duct 38, and upstream of the GPU 40. The condenser 66 comprises a pump 67 which is operative for circulating a cooling liquid, such as water. A heat exchanger 68 is arranged for cooling the circulating cooling liquid. In the condenser 66, the cooling liquid is brought into contact with the at least partly cleaned carbon dioxide rich flue gas entering the condenser 66 via the duct 38. The contact between the circulating cooling liquid and the at least partly cleaned carbon dioxide rich flue gas in the condenser 66 causes a condensation of at least a portion of the water vapour content of the at least partly cleaned carbon dioxide rich flue gas. Hence, the water vapour content of the at least partly cleaned carbon dioxide rich flue gas entering the GPU 40 will be reduced. Typically, the condenser 66 would cause a reduction of the water vapour content of the at least partly cleaned carbon dioxide rich flue gas from typically about 15-40% by volume, to typically about 0.5-10% by volume. Hence, the amount of water vapour that would need to be removed from the carbon dioxide in the GPU 40 is substantially reduced by means of the condenser 66.

The GPU 40 may comprise a number of per se known parts that are integrated to a GPU 40 which provides for a final polishing of the carbon dioxide rich flue gas and compresses the carbon dioxide rich flue gas to a suitable pressure for transport to disposal.

The GPU 40 may comprise, as its main units, a low pressure compression unit 70, an intermediate dehydration unit, for example a molecular sieve unit 71, an intermediate non-condensable gas removal unit, for example a $CO_2$ liquefaction unit 72, and a high pressure compression unit 73.

An at least partly cleaned carbon dioxide rich flue gas is forwarded from the gas cleaning system 6, 106, 206, as the case may be, to the low pressure compression unit 70 via the duct 38. The low pressure compression unit 70 comprises typically two to six low pressure compression arrangements 74 arranged in series, each such arrangement 74 comprising a compression device in the form of at least one compressor 75, a cooler 76, and a gas-liquid separator 77. FIG. 5 illustrates four such low pressure compression arrangements 74, 74', 74" and 74'". The respective compressor 75 compresses the gas which is then forwarded to the respective cooler 76. The respective cooler 76 is supplied with a cooling media circulated in coolers 76 via pipe system 78, for cooling the compressed gas. As an effect of such cooling water vapour condenses. Such condensed water vapour is separated from the remaining carbon dioxide rich flue gas in the respective gas-liquid separator 77. The water is removed via a pipe system 79. The gas is then forwarded to the subsequent arrangement 74. Typically each low pressure compression arrangement 74 has a compression ratio of 1.5 to 2.5. Hence, the carbon dioxide rich flue gas entering the low pressure compression unit 70 may have a pressure which is close to atmospheric pressure, i.e. around 1 bar (a), and the carbon dioxide rich flue gas leaving the low pressure compression unit 70, after being treated in, for example, four consecutive low pressure compression arrangements 74, may have a pressure of typically 20-50 bar(a), more typically 20-40 bar (a), and most typically 30-40 bar (a). Simultaneously with the pressure being increased with each arrangement 74 the water content of the gas is reduced, since condensed water vapour is removed from each gas-liquid separator 77. Typically, the gas entering the low pressure compression unit 70 via duct 38 may have a water content of 0.5-50% by volume, more typically a water content of 0.5 to 10% by volume if a condenser 66 is arranged upstream of the unit 70, and typically a water content of 15-40% by volume when there is no condenser. The gas leaving the low pressure compression unit 70 may typically have a water vapour content of 400-1500 parts per million (ppm).

The carbon dioxide rich flue gas, having a pressure of 30-40 bar(a), a water vapour content of 400-1500 ppm and a temperature of typically 20-40° C. leaves the low pressure compression unit 70 and is forwarded, via a duct 80, to the dehydration unit 71, which may be a molecular sieve unit of a per se known type supplied by UOP LLC, Des Plaines, Ill., USA. The dehydration unit 71, which is schematically indicated in FIG. 5, removes a further portion of the water vapour, while leaving the gas pressure substantially unaffected. Water vapour and other contaminants leave via pipes 80' and are disposed of. Typically, the carbon dioxide rich flue gas leaving the dehydration unit 71 via a duct 81 has a water vapour content of 25 to 300 ppm, typically around 100 ppm.

It will be appreciated that other devices could be used as an intermediate dehydration unit, as alternative to the molecular sieve unit 71. One example of such an alternative intermediate dehydration unit is a glycol scrubber in which glycol is circulated for capturing water vapour.

The carbon dioxide rich flue gas is transported, via duct 81, to the $CO_2$ liquefaction unit 72. The $CO_2$ liquefaction unit 72 comprises a heat exchanger 82, a flash vessel 83 and flash valves 84. The carbon dioxide rich flue gas entering the unit 72 is first cooled in the heat exchanger 82 by being cooled by non-condensable gases and liquefied $CO_2$ leaving the flash vessel 83 via pipes 85 and 86 and acting as cooling medias. The cooled carbon dioxide rich flue gas then enters the flash vessel 83. In the flash vessel 83, the gas is flashed to a lower pressure, typically a pressure which is 5-15 bar lower than that pressure, being 30-40 bar (a), at which the carbon dioxide rich flue gas enters $CO_2$ liquefaction unit 72. As an effect to such flashing, the temperature of the carbon dioxide rich flue gas is decreased to such low value that the carbon dioxide becomes liquefied. Hence, liquefied carbon dioxide is collected from the bottom of flash vessel 83 and is transported away from the same via pipe 86. The pressure in flash vessel 83 is controlled, by means of valves 84, to such a level that mainly carbon dioxide is liquefied, leaving other gases, including, for example, nitrogen, $N_2$, oxygen, $O_2$, and argon, Ar, in a gaseous state. Such other gases, which may be referred to as non-condensable gases, leave the flash vessel 83 via pipe 85. The flash valves 84 are utilized for controlling pressure in flash vessel 83 to achieve condensation of carbon dioxide, but not of non-condensable gases. In heat exchanger 82 the liquefied carbon dioxide is reheated to form again a carbon dioxide gas, such gas leaving the $CO_2$ liquefaction unit 72 via duct 87. The carbon dioxide gas leaving unit 72 via duct 87 typically has a pressure of 25-30 bar (a) and a temperature of 20-60° C. The non-condensable gases leave $CO_2$ liquefaction unit 72 via a duct 88 and may be disposed of. As an effect of the liquefaction in unit 72, the carbon dioxide leaving unit 72 via duct 87 may typically have a carbon dioxide concentration of as much as 90-95% by volume, while carbon dioxide rich flue gas entering unit 72 via duct 81 typically has a carbon dioxide concentration of only about 75 to 85% by volume.

It will be appreciated that other devices could be used as an intermediate non-condensable gas removal unit, as alternative to the $CO_2$ liquefaction unit 72. One example of such an alternative intermediate non-condensable gas removal unit include a distillation tower, which is utilized when a very high purity of the carbon dioxide is desired.

Carbon dioxide gas transported in duct 87 enters high pressure compression unit 73. The high pressure compression unit 73 comprises typically one to three high pressure compression arrangements 89 arranged in series, each such arrangement 89 comprising a compression device in the form of at least one compressor 90, and a cooler 91. The respective compressor 90 compresses the gas which is then forwarded to the respective cooler 91. The respective cooler 91 is supplied with a cooling media circulated in the coolers 91 via pipe system 92, for cooling the compressed gas. Each compressor 90 has a compression ratio of 1.5 to 2.5, meaning that the carbon dioxide gas leaving high pressure compression unit 73 via the duct 41 has a pressure of, typically, 100-200 bar(a), more often 110-140 bar(a) and a temperature of typically 20-60° C. The carbon dioxide in duct 41 may be transported away for final disposal or for reuse in a process using carbon dioxide as a utility gas.

As described hereinbefore a portion of the carbon dioxide gas of the GPU 40 is utilized as a utility gas for various purposes in the various gas cleaning systems 6, 106, 206. Carbon dioxide gas is available at different pressures and different purities depending on where in the GPU 40 such carbon dioxide gas is collected. Hence, the requirements of the specific gas cleaning device will determine from what position of the GPU 40 a suitable gas can be collected.

The fabric filters 8, 111, 211 described hereinbefore with reference to FIGS. 1*b*, 2*a*, and 4 typically need a gas which is rather clean with a rather low water vapour content, and which has an absolute gas pressure of 2-6 bar, for pulse cleaning of the filter bags. Such a gas can typically be found downstream of the gas-liquid separator 77' of the second low pressure compression arrangement 74' of the low pressure compression unit 70. A duct 93 may be utilized for forwarding a gas portion collected just downstream of the gas-liquid separator 77' to the relevant duct 42, 145, 242, and further to the respective fabric filter 8, 111, 211. Optionally, a dryer, such as a per se known adsorption dryer, could be utilized for drying the gas portion collected downstream of the gas liquid separator 77' before using such gas portion for pulsing the fabric filters 8, 111, 211, to ensure a sufficiently low moisture content desired for fabric filter pulsing. According to an alternative embodiment, a duct 94 may be connected to the duct 81, downstream of dehydration unit 71, where the carbon dioxide rich flue gas has a pressure of 30-40 bar(a) and a low water vapour content as described hereinabove. Hence, in accordance with one embodiment, the duct 94 supplies pulsing gas to the respective fabric filter 8, 111 or 211. A pressure reduction valve 95 may be arranged on duct 94, and/or on duct 93 to reduce the gas pressure to a suitable value, being typically 2-6 bar(a) for the respective fabric filter 8, 111, 211. According to another embodiment a duct 96 connected to the carbon dioxide supply duct 42, 145, 242 may be connected to the duct 87 forwarding carbon dioxide gas from the $CO_2$ liquefaction unit 72 to the high pressure compression unit 73. The gas in duct 87 has a lower content of non-condensable gases than the gas in duct 81, but the non-condensable gases are normally not a problem to a fabric filter. According a further embodiment a duct 97 connected to the carbon dioxide supply duct 42, 145, 242 may be connected to the duct 80 forwarding carbon dioxide gas from the low pressure compression unit 70 to the dehydration unit 71.

The slurry atomization arrangement 150 of spray dryer absorber 110 described hereinbefore with reference to FIGS. 2a and 2b typically needs a gas having a gauge pressure of 2-6 bar and a temperature of typically 80-120° C. Such a gas can be found immediately downstream of the compressor 75' of the second low pressure compression arrangement 74'. A duct 98 may be utilized for forwarding such a gas to the duct 143 and further to the slurry atomization arrangement 150.

The cover 188 of electrostatic precipitator 108 described hereinbefore with reference to FIGS. 3a and 3b is preferably supplied with a rather hot gas, to avoid any problems of corrosion or condensation of, for example, water vapour, on the isolator 180. The pressure requirement is quite moderate, since a gauge pressure of 50 to 5000 Pa over atmospheric pressure is often sufficient for cover 188 of electrostatic precipitator 108. Hence, a carbon dioxide gas may preferably be forwarded to gas supply duct 142 via duct 99, forwarding carbon dioxide gas collected immediately after the compressor 75 of the first low pressure compression arrangement 74. A pressure reduction valve, not shown, may be utilized for reducing the pressure, if necessary. In some cases an even purer carbon dioxide gas is preferable for reasons of ensuring that no fouling or condensation occurs on the isolator 180, such gas being forwarded to gas supply duct 142 via ducts 94 or 96.

The mixing device 210 and the fluidized trough 215 of gas cleaning system 206 described hereinbefore with reference to FIG. 4 may sometimes be operated with a fluidization gas of limited purity, since the mixing device 210 and the trough 215 are often not that sensitive to impurities in the gas. It is preferable that the gas is rather warm, preferably having a temperature of at least 70° C., to avoid condensation of water vapour. Hence, a carbon dioxide gas may preferably be forwarded to gas supply duct 243 via duct 99, forwarding carbon dioxide gas collected immediately downstream of the compressor 75 of the first low pressure compression arrangement 74 of the low pressure compression unit 70. Optionally, a pressure reduction valve, not shown, may be utilized for reducing the pressure before introducing the gas in the mixing device 210 and/or the trough 215. In cases where pipe 216 and/or pipe 218 is an air slide, gas for fluidization may be forwarded to such pipe 216, 218 via duct 99 and further to duct 243.

Although ducts 93, 94, 96, 97, 98, and 99 have been described as possible options for forwarding a carbon dioxide gas to a device of a gas cleaning system 6, 106, 206 it will be appreciated that other ducts could be provided for the same purpose. For example, a duct 99' could be arranged for forwarding a portion of carbon dioxide gas collected just downstream of the gas-liquid separator 77. Furthermore, it would, for example, be possible to provide such a duct between another two consecutive low pressure compression arrangements 74 than the first and second one, illustrated in FIG. 5. It would also be possible to provide such a duct between two consecutive high pressure compression arrangements 89 of high pressure compression unit 73.

Furthermore, it will be appreciated that in a gas cleaning system, such as each of the gas cleaning systems 6, 106 and 206, comprising several gas cleaning devices, those gas cleaning devices could receive gas from different locations in the GPU 40, depending on the requirements for each gas cleaning device. Hence, for example, in the gas cleaning system 206, the mixing device 210 could receive gas forwarded via the duct 99, and the fabric filter 211 could receive gas forwarded via duct 96.

It will be appreciated that numerous variants of the embodiments described above are possible within the scope of the appended claims.

Hereinbefore it has been described that the compressed and at least partly cleaned carbon dioxide gas from GPU 40, or blower 245, as the case may be, is forwarded to a gas cleaning device, such as fabric filter 8, 111, 211, electrostatic precipitator 108, spray dryer 110, or mixing device 210, belonging to the same boiler system 1, 101, 201 as the GPU 40, and/or the blower 245. While this is often preferred, it is also possible to forward partly cleaned carbon dioxide gas from GPU 40, or blower 245, to a gas cleaning device belonging to a gas cleaning system of another boiler system, for example a gas cleaning device of a gas cleaning system of a boiler system which is parallel to that boiler system in which the carbon dioxide rich flue gas giving rise to the compressed and at least partly cleaned carbon dioxide gas was generated.

According to one alternative embodiment, a pressurized and partly cleaned carbon dioxide gas could be forwarded to a pressure tank for being temporarily stored, prior to being utilized as a utility gas in a gas cleaning device. Such a pressure tank could be useful during start-up situations, since it might take some time before a carbon dioxide gas of suitable quality is available. Hence, during start-up a carbon dioxide gas could be forwarded from the pressure tank to the gas cleaning device in question.

Hereinbefore it has been described that the pressurized and partly cleaned carbon dioxide gas is utilized as a utility gas in a fabric filter, an electrostatic precipitator, a spray dryer or a mixing device. It will be appreciated that such a gas may also be utilized as a utility gas in other types of gas cleaning devices, and also in other locations of those gas cleaning devices described hereinbefore.

Hereinbefore, it has been described that the boiler system 1, including the boiler 2 and the gas cleaning system 6, operates at close to atmospheric conditions. It will be appreciated that it is also possible to arrange a boiler operating under pressurized conditions, such as an absolute pressure of 2 to 50 bar. An example of a boiler type operating under such conditions is the pressurized fluidized bed combustion (PFBC) boiler. It will be appreciated that with a boiler operating at, for example, an absolute pressure of 10 bar, the carbon dioxide gas utilized as a utility gas for pulsing fabric filter, flushing isolators of a electrostatic precipitators, etc. would need to have a correspondingly higher pressure, as compared to a boiler system operating at close to atmospheric conditions.

To summarize, a boiler system 1; 101; 201 comprises a boiler 2 for combusting a fuel in the presence of a gas containing oxygen gas, and a gas cleaning system 6; 106; 206. The boiler system 1; 101; 201 comprises a compression device 75; 90; 245 being operative for pressurizing at least a portion of the carbon dioxide rich flue gas from which at least a portion of the contaminant content has been removed, and a carbon dioxide supply duct 42; 142; 143; 145; 242; 243; 244 being operative for forwarding at least a portion of the pressurized carbon dioxide rich flue gas to at least one gas cleaning device 8; 108; 110; 111; 210; 211 for being utilized as a utility gas therein.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of cleaning a carbon dioxide rich flue gas generated in a boiler combusting a fuel in the presence of a gas containing oxygen gas, the method comprising:
    forwarding the carbon dioxide rich flue gas from the boiler to a gas cleaning system,
    removing in said gas cleaning system at least a portion of a contaminant content of the carbon dioxide rich flue gas,
    pressurizing at least a portion of the carbon dioxide rich flue gas from which at least the portion of the contaminant content has been removed, and
    forwarding at least a portion of the pressurized portion of the carbon dioxide rich flue gas from which at least the portion of the contaminant content has been removed to at least one gas cleaning device for being utilized as a utility gas therein; and
    utilizing the pressurized portion of the carbon dioxide rich flue gas from which at least the portion of the contaminant content has been removed by at least one of:
    (i) flushing a cover for an isolator of the at least one gas cleaning device in the form of an electrostatic precipitator;
    (ii) atomizing an absorption liquid of the at least one gas cleaning device in the form of a spray dryer absorber; and
    (iii) fluidization of a particulate material of the at least one gas cleaning device in the form of a mixing device supplying the particulate material mixed with absorbent to a contact reactor bringing the particulate material mixed with the absorbent into contact with the carbon dioxide rich flue gas.

2. The method according to claim 1, wherein said pressurizing is conducted in a gas compression and purification unit operating to prepare from the carbon dioxide rich flue gas that has been cleaned in the gas cleaning system a pressurized carbon dioxide gas for disposal.

3. The method according to claim 2, wherein the gas compression and purification unit comprises a low pressure compression unit being operative for increasing the pressure of the carbon dioxide rich flue gas to a pressure of 20 to 50 bar absolute pressure, wherein said forwarding at least a portion of the pressurized portion of the carbon dioxide rich flue gas comprises forwarding to said at least one gas cleaning device a gas that has passed through at least a part of the low pressure compression unit.

4. The method according to claim 3, wherein said forwarding at least the portion of the pressurized portion of the carbon dioxide rich flue gas comprises forwarding to said at least one gas cleaning device a gas that has passed through an intermediate dehydration unit located downstream of the low pressure compression unit.

5. The method according to claim 1, comprising utilizing a portion of the pressurized portion of the carbon dioxide rich flue gas from which at least the portion of the contaminant content has been removed for pulse-cleaning the at least one gas cleaning device in the form of a fabric filter.

6. The method according to claim 1, wherein the pressurized portion of the carbon dioxide rich flue gas from which at least the portion of the contaminant content has been removed is utilized for the flushing of the cover for the isolator of the at least one gas cleaning device in the form of the electrostatic precipitator.

7. The method according to claim 1, wherein the pressurized portion of the carbon dioxide rich flue gas from which at least the portion of the contaminant content has been removed is utilized for the atomizing of the absorption liquid of the at least one gas cleaning device in the form of the spray dryer absorber.

8. The method according to claim 1, wherein the pressurized portion of the carbon dioxide rich flue gas from which at least the portion of the contaminant content has been removed is utilized for the fluidization of the particulate material of the at least one gas cleaning device in the form of the a mixing device supplying the particulate material mixed with the absorbent to the contact reactor bringing the particulate material mixed with the absorbent into contact with the carbon dioxide rich flue gas.

9. The method according to claim 8, wherein at least a portion of the pressurized portion of the carbon dioxide rich flue gas, from which at least the portion of the contaminant content has been removed, that is forwarded to the mixing device is collected downstream of a filter removing the particulate material supplied to said contact reactor by said mixing device, the carbon dioxide rich flue gas being collected, pressurized and forwarded to said mixing device prior to passing through a gas compression and purification unit.

10. A boiler system comprising:
    a boiler for combusting a fuel in the presence of a gas containing oxygen gas, and a gas cleaning system being operative for removing at least a portion of a contaminant content of a carbon dioxide rich flue gas generated in the boiler, a compression device being operative for pressurizing at least a portion of the carbon dioxide rich flue gas from which at least the portion of the contaminant content has been removed, and
    a carbon dioxide supply duct being operative for forwarding at least a portion of the pressurized portion of the carbon dioxide rich flue gas from which at least the portion of the contaminant content has been removed to at least one gas cleaning device for being utilized as a utility gas therein; and
    wherein the at least one gas cleaning device comprises at least one of:
    (i) an electrostatic precipitator, the carbon dioxide supply duct being operative for forwarding the pressurized portion of the carbon dioxide rich flue gas from which at least the portion of the contaminant content has been removed to an isolator flushing system of the electrostatic precipitator,
    (ii) a spray dryer absorber, the carbon dioxide supply duct being operative for forwarding the pressurized portion of the carbon dioxide rich flue gas from which at least the portion of the contaminant content has been removed to a slurry atomization arrangement of the spray dryer absorber, and (iii) a mixing device supplying particulate material mixed with absorbent to a contact reactor being operative for bringing the particulate material mixed with the absorbent into contact with the carbon-dioxide rich flue gas, the carbon dioxide supply duct being operative for forwarding the pressurized portion of the carbon dioxide rich flue gas from which at least the portion of the contaminant content has been removed to the mixing device for fluidizing the particulate material in the mixing device.

11. The boiler system according to claim 10, wherein the boiler system further comprises a gas compression and purification unit being operative for preparing from the carbon dioxide rich flue gas that has been cleaned in the gas cleaning system a pressurized carbon dioxide gas for disposal, said compression device being included in the gas compression and purification unit, said carbon dioxide supply duct being operative for forwarding at least a portion of said pressurized portion of the carbon dioxide rich flue gas from which at least a portion of the contaminant content has been removed, from the gas compression and purification unit to said at least one gas cleaning device.

12. The boiler system according to claim 11, wherein the gas compression and purification unit comprises a low pressure compression unit being operative for increasing the pressure of the carbon dioxide rich flue gas to a pressure of 20 to 50 bar absolute pressure, the carbon dioxide supply duct being operative for forwarding to said at least one gas cleaning device a gas that has passed through at least a part of the low pressure compression unit.

13. The boiler system according to claim 10, wherein the at least one gas cleaning device forms part of the gas cleaning system.

14. The boiler system according to claim 10, wherein the at least one gas cleaning device comprises a fabric filter, the carbon dioxide supply duct being operative for forwarding the pressurized portion of the carbon dioxide rich flue gas from which at least a portion of the contaminant content has been removed to a pulse-cleaning system of the fabric filter.

15. The boiler system according to claim 10, wherein the at least one gas cleaning device comprises the electrostatic precipitator, the carbon dioxide supply duct being operative for forwarding the pressurized portion of the carbon dioxide rich flue gas from which at least the portion of the contaminant content has been removed to the isolator flushing system of the electrostatic precipitator.

16. The boiler system according to claim 10, wherein the at least one gas cleaning device comprises the spray dryer absorber, the carbon dioxide supply duct being operative for forwarding the pressurized portion of the carbon dioxide rich flue gas from which at least the portion of the contaminant content has been removed to the slurry atomization arrangement of the spray dryer absorber.

17. The boiler system according to claim 10, wherein the at least one gas cleaning device comprises the mixing device supplying the particulate material mixed with the absorbent to the contact reactor being operative for bringing the particulate material mixed with the absorbent into contact with the carbon dioxide rich flue gas, the carbon dioxide supply duct being operative for forwarding the pressurized portion of the carbon dioxide rich flue gas from which at least the portion of the contaminant content has been removed to the mixing device for fluidizing the particulate material in the mixing device.

* * * * *

UNITED STATES PATENT AND TRADEMARK OFFICE
CERTIFICATE OF CORRECTION

PATENT NO. : 9,638,416 B2  
APPLICATION NO. : 13/988518  
DATED : May 2, 2017  
INVENTOR(S) : Grubbström Page 1 of 1

It is certified that error appears in the above-identified patent and that said Letters Patent is hereby corrected as shown below:

On the Title Page

In Item (75), under "Inventor", in Column 1, Line 1, delete "Vaxjo" and insert -- Växjö --, therefor.

In Item (73), under "Assignee", in Column 1, Line 1, delete "GmbH" and insert -- GmbH, Baden (CH) --, therefor.

In the Specification

In Column 1, Line 21, delete "dioxide" and insert -- dioxide, --, therefor.

In Column 4, Line 30, delete "FIG. 2a" and insert -- FIG. 2a. --, therefor.

In Column 7, Line 29, delete "form of" and insert -- form of, --, therefor.

In Column 13, Line 34, delete "disposed of" and insert -- disposed of. --, therefor.

In Column 16, Line 57, delete "a electrostatic" and insert -- electrostatic --, therefor.

In the Claims

In Column 18, Line 29, in Claim 8, delete "of the a" and insert -- of a --, therefor.

Signed and Sealed this  
Twenty-fifth Day of July, 2017

Joseph Matal  
*Performing the Functions and Duties of the*  
*Under Secretary of Commerce for Intellectual Property and*  
*Director of the United States Patent and Trademark Office*